US010383316B2

(12) United States Patent
Bahrebar

(10) Patent No.: US 10,383,316 B2
(45) Date of Patent: Aug. 20, 2019

(54) AQUARIUM FILTER

(71) Applicant: Soheil Bahrebar, Tehran (IR)

(72) Inventor: Soheil Bahrebar, Tehran (IR)

(*) Notice: Subject to any disclaimer, the term of this patent is extended or adjusted under 35 U.S.C. 154(b) by 0 days.

(21) Appl. No.: 15/516,351

(22) PCT Filed: Aug. 2, 2015

(86) PCT No.: PCT/IB2015/055855
§ 371 (c)(1),
(2) Date: Mar. 31, 2017

(87) PCT Pub. No.: WO2017/021755
PCT Pub. Date: Feb. 9, 2017

(65) Prior Publication Data
US 2018/0132457 A1 May 17, 2018

(51) Int. Cl.
*A01K 63/04* (2006.01)
*C02F 3/04* (2006.01)
*C02F 1/32* (2006.01)

(52) U.S. Cl.
CPC ............ *A01K 63/045* (2013.01); *C02F 1/325* (2013.01); *C02F 3/043* (2013.01)

(58) Field of Classification Search
CPC ........ A01K 63/045; C02F 1/325; C02F 3/043
USPC ......... 210/167.22, 167.25, 167.26, 150, 151; 119/260, 227
See application file for complete search history.

(56) References Cited

U.S. PATENT DOCUMENTS 5,026,477 A    6/1991 Yen
5,054,424 A *  10/1991 Sy ..................... A01K 63/045
                                             119/231

FOREIGN PATENT DOCUMENTS

DE  202009003919 U1   5/2009
EP       2289313 A1 *  3/2011
JP     H11-197420 A    7/1999
KR    20100116904 A   11/2010
WO    2005/090782 A2   9/2005

OTHER PUBLICATIONS

PCT/IB015/055855 Written Opinion of the International Searching Authority dated May 4, 2016.
International Search Report dated May 4, 2016 from International Patent Application No. PCT/IB2015/055855.

* cited by examiner

*Primary Examiner* — Fred Prince
(74) *Attorney, Agent, or Firm* — NovoTechIP International PLLC

(57) ABSTRACT

An aquarium water filtering system includes a first filtering section, a second filtering section, and a third filtering section. The first filtering section has a first housing configured to receive water, perform a first filtering action on the received water, and produce a first filtered water. The second filtering section has a second housing placed horizontally adjacent to the first housing and configured to receive first filtered water, perform a second filtering action on the first filtered water, and produce a second filtered water. The third filtering section has a third housing placed horizontally adjacent to the second housing and configured to receive the second filtered water, perform a third filtering action on the second filtered water, and produce a third filtered water for return to the aquarium.

12 Claims, 3 Drawing Sheets

AQUARIUM FILTER

CROSS-REFERENCE TO RELATED APPLICATIONS

This application is a National Stage of International patent application PCT/IB2015/055855, filed on Aug. 2, 2015, the disclosure of which is incorporated by reference in its entirety.

BACKGROUND

In the regular course of maintaining an aquarium containing plants, fish, and/or other aquatic life, there is a need to keep the aquarium physically and chemically clean. Waste and detritus tend to accumulate in the water of the aquarium, such as bits of vegetable remains from plants that have died, remains from food, and waste generated from creatures living in the aquarium. Such waste also can result in undesired odors, unwanted bacterial growth, contamination, infection, and disease in the aquarium. Conventional electronic filters may create a stressful environment for aquatic animals. Providing a suitable, clean and livable environment, far from any stress is very necessary for the growth and reproduction of aquatic plants and animals. Accordingly, it is useful to have a filter system that purifies the water. This utility is increased when the filter system can remain effective at a desired throughput for an extended period of time without replacement of the filter material filling. It is also desirable to utilize naturally sourced and chemical-free filter materials to reduce the environmental impact of sourcing or disposing of filter materials.

SUMMARY

In one general aspect, the instant application describes an aquarium water filtering system including a first filtering section having a first housing configured to receive an aquarium water for an aquarium, perform a first filtering action on the received aquarium water, and produce a first filtered water; a second filtering section having a second housing placed horizontally adjacent to the first housing and configured to receive the first filtered water, perform a second filtering action on the first filtered water, and produce a second filtered water; a third filtering section having a third housing placed horizontally adjacent to the second housing and configured to receive the second filtered water, perform a third filtering action on the second filtered water, and produce a third filtered water for return to the aquarium, in which the second filtering section includes: a distribution plate configured to distribute the first filtered aquarium water over an interior of the second housing; a biological filter material located below the distribution plate and configured to perform a portion of the second filtering action; and a UV light located above the distribution plate and configured to irradiate water passing through the distribution.

The second filtering section may further include an aeration tube configured to release air below the biological filter material.

The second filtering section may further include a filter layer comprising sand or gravel that is at least 10 cm thick, wherein the filter layer is located above the biological filter and below the distribution plate.

The UV light may be positioned above an inlet through which the second filtering section receives the first filtered water.

The second filtering section may further include a first filtering layer comprising crushed igneous rock that is at least 4 cm thick, wherein the first filtering layer is located below the biological filter.

The second filtering section may further include second and third filtering layers each including cork, cotton, wool, or silk, wherein the second filtering layer is located between the biological filter and the first filtering layer, and the third filtering layer is located below the first filter layer.

The second filtering layer may be at least 1 cm thick, and the third filtering layer may be at least 0.5 cm thick.

The second filtering section may further include fourth and fifth filtering layers each including sand or gravel, wherein the fourth filtering layer is located between the biological filter and the second filtering layer and the fifth filtering layer is located below the third filtering layer.

The second filtering section may further include a sixth filtering layer including cork, cotton, wool, or silk, wherein the sixth filtering layer is located below the fifth filtering layer.

The first filtering section may be further configured to deliver the received aquarium water below a first filtering material and withdraw the first filtered water from above the first filtering material.

The first filtering material may include cork, cotton, wool, or silk.

The first filtering section may be further configured to receive the aquarium water at a height above the first filtering material.

The foregoing and other objects, features, aspects and advantages of the present invention will become more apparent from the following detailed description of the present application when taken in conjunction with the accompanying drawing.

BRIEF DESCRIPTION OF THE DRAWINGS

The drawing figures depict one or more implementations in accord with the present teachings, by way of example only, not by way of limitation.

FIG. 4 illustrates a cross section of an example of a third filtering section of the aquarium filter system shown in FIG. 1.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
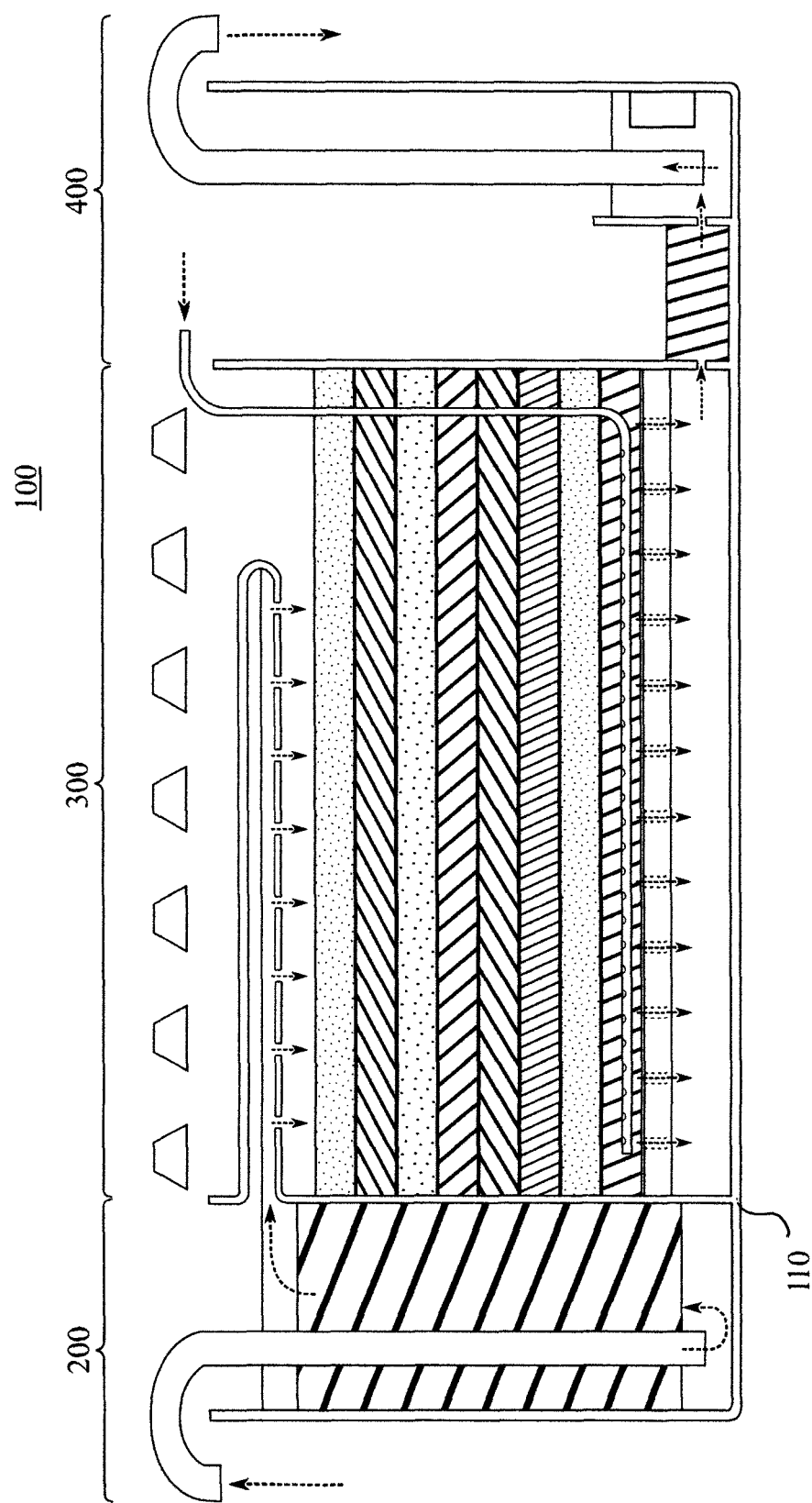
FIG. 1 illustrates a cross section of an example of an aquarium filter system.

FIG. 1 illustrates a cross-section of an example of an aquarium filter system 100. Aquarium filter system 100 includes three sections: first filtering section 200, which receives unfiltered water for an aquarium (not illustrated) via inlet 211; second filtering section 300, which receives water from first section 200; and third filtering section 400, which receives water from second section 300 and returns filtered water to the aquarium via outlet 452. The three filtering sections 100, 200, and 300 are described in detail below. Although the three filtering sections 100, 200, and 300 are illustrated as horizontally adjacent to each other in FIG. 1, other arrangements are within the capabilities of those skilled in the art. In the example illustrated in FIG. 1, the three filtering sections 100, 200, and 300 are all placed in a single housing 110. However, in some examples, any or all of the three filtering sections 100, 200, and 300 may be placed in separate housings. In some examples, aquarium filter system 100 may be positioned behind the aquarium. In such examples, the height of aquarium filter system 100 may be about 5-10 cm shorter than the aquarium to reduce its visibility.

In some examples, multiple aquarium filter systems 100 may be used for a single aquarium. For example, the multiple aquarium filter systems 100 may be used in parallel, to obtain increased filtering throughput. As another example, the multiple aquarium filter systems 100 may be used serially, where the output from a first aquarium filter system 100 is supplied to the input of a second aquarium filter system 100, to provide additional purification and/or redundancy in the event of a failure in one of the multiple aquarium filter systems 100. Additionally, aquarium filter system 100 may be combined with other filters or water treatment systems. For example, one may add a stage of chemical filtration.

Figure 2:
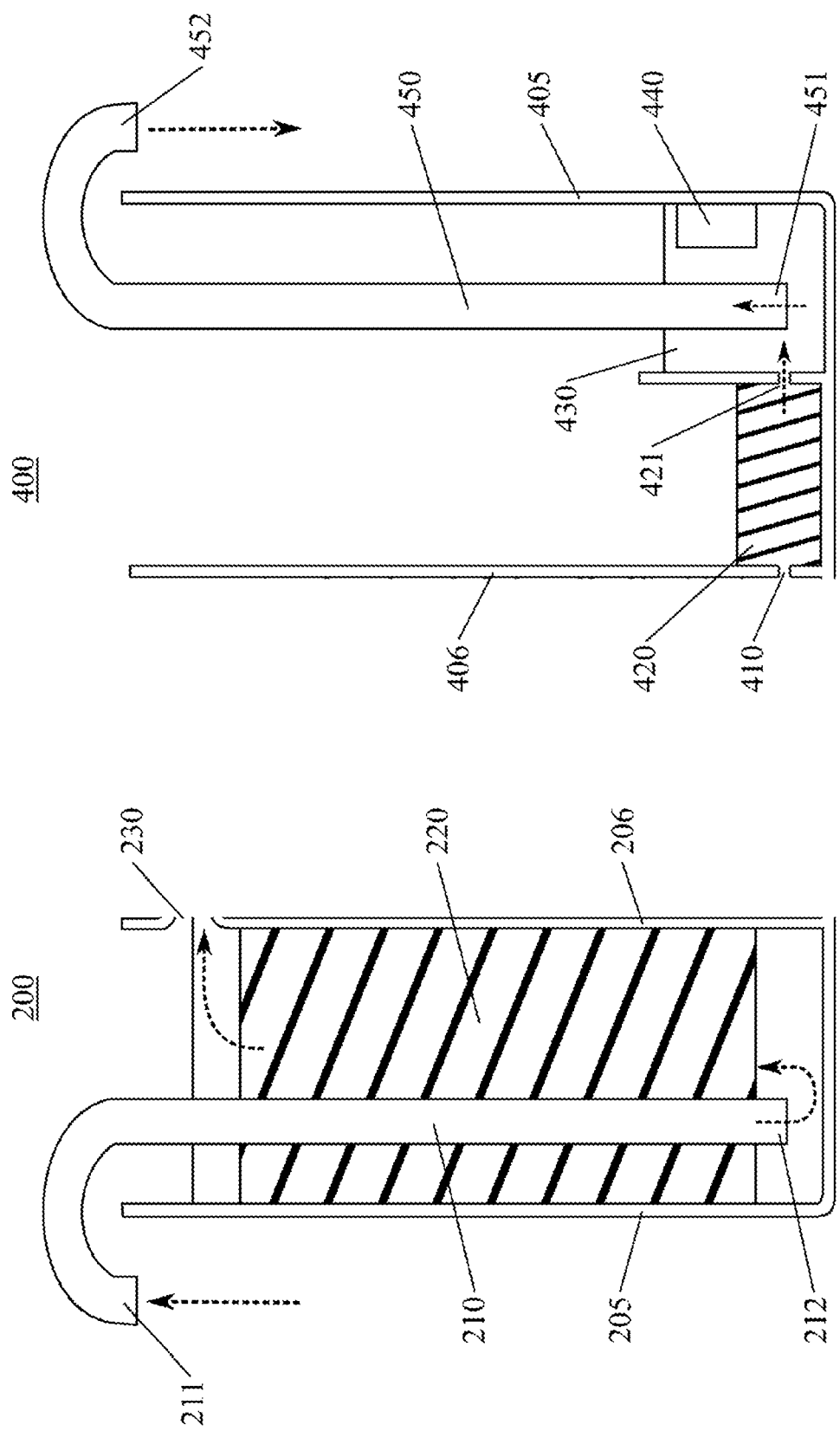
FIG. 2 illustrates a cross section of an example of a first filtering section of the aquarium filter system shown in FIG. 1.

FIG. 2 illustrates a cross-section of an example of the first filtering section 200 of aquarium filter system 100. First filtering section 200 is placed in and includes housing 205, which includes wall 206. In the example illustrated in FIG. 1, in which the first filtering section 200 is horizontally adjacent to second filtering section 300, housing 205 is a portion of housing 110, and wall 206 serves as a partition between first filtering section 200 and second filtering section 300. In some examples, first filtering section 200 has a width of approximately 5 cm.

First filtering section 200 includes piping 210, which receives unfiltered water from an aquarium (not illustrated) or water from another source via inlet 211, and delivers the received water to outlet 212 at the base of first filtering section 200. In some examples, piping 210 has a diameter of approximately 2-5 cm. In some examples, filter material and/or filtering element(s) may be included in piping 210. For example, a wire mesh may be included to perform an initial removal of large particulates from the water.

From the area at the base of first filtering section 200 near outlet 212 at the base of first section 200, the received water passes upward through filter material 220. Filter material 220 removes solid material, among other things, from the water, such as coarse particles in the received water. Filter material 200 may include, but is not limited to, materials such as cork, feathers, cotton, wool, and/or silk. Although silk is particularly effective, it is also generally more expensive than the other options. After this initial filtering through filter material 220, the water exits the second filtering stage 200 via opening 230 to pass to second filtering stage 200. FIG. 2 illustrates a gap below filter material 220, which allows for increased surface area for the initial interface between the received water and the lower surface of filter material 220. In some examples, the geometry of the lower surface of filter material may be varied to further increase the surface area for the initial interface. In some examples, a wire mesh or other porous structure may be provided to keep filter material 220 in place, or to encapsulate filter material 220 to facilitate its replacement.

In some examples, first filtering section 200 may be configured and oriented such that water proceeds horizontally, rather than vertically through filter material 220. In some examples, an intermediate filtering section (not illustrated) may be included between first filtering section 200 and second filtering section 300. In such examples, the intermediate filtering section performs a second coarse filtering of the water output via outlet 230, using filter material which is the same as or similar to filter material 220, and provides the further-filtered water to second filtering section 300. The intermediate filtering section may reduce the frequency with which filter material needs to be replaced, and also may produce an overall increase in filtering effectiveness.

Figure 3:
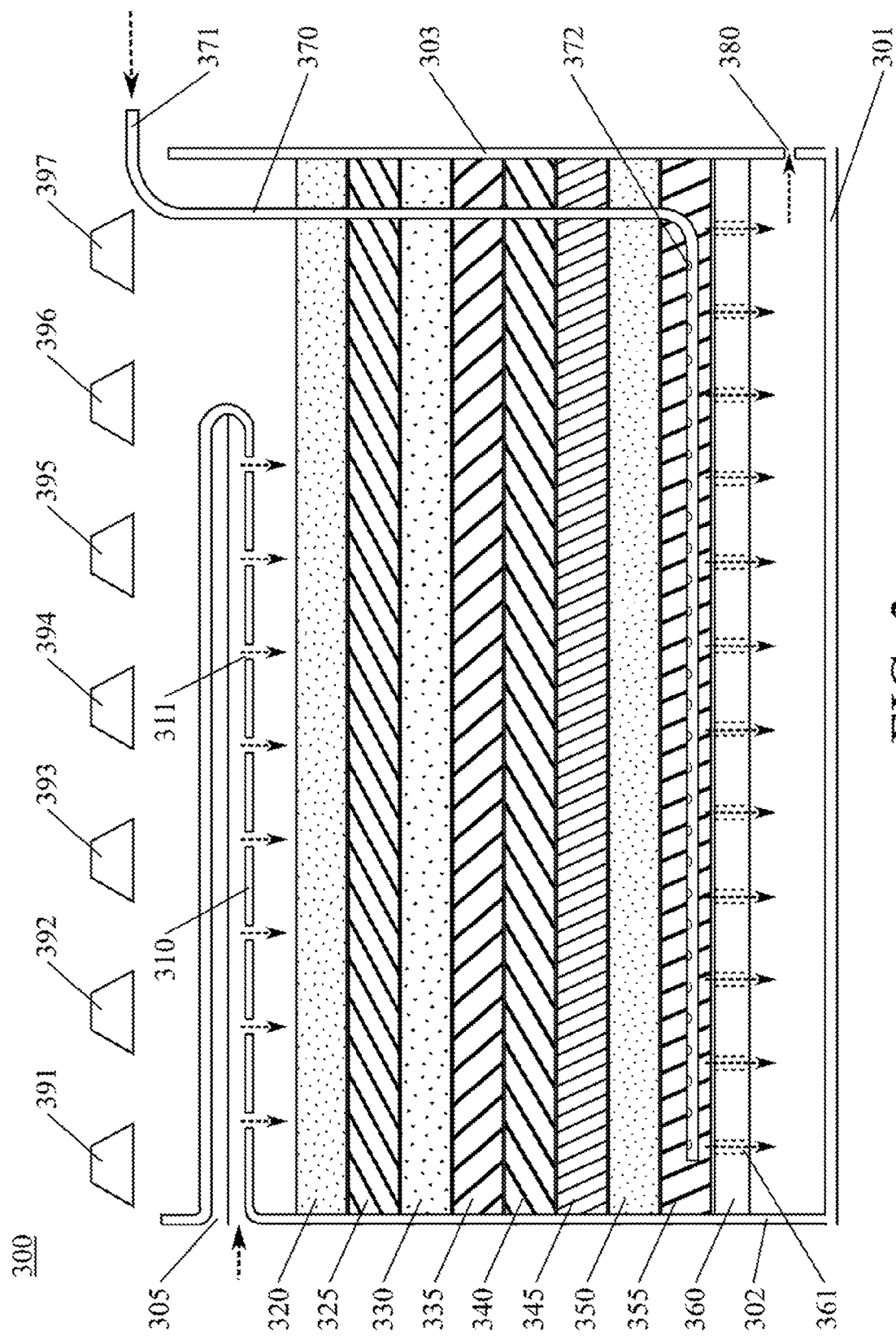
FIG. 3 illustrates a cross section of an example of a second filtering section of the aquarium filter system shown in FIG. 1.

FIG. 3 illustrates a cross-section of an example of the second filtering section 300 of aquarium filter system 100. Second filtering section 300 is placed in and includes housing 301, which includes walls 302 and 303. In the example illustrated in FIG. 1, in which second filtering section is located horizontally between first filtering section 200 and third filtering section 400, housing 301 is a portion of housing 110, wall 302 serves as a partition between first filtering section 200 and second filtering section 300, and wall 303 serves as a partition between second filtering section 300 and third filtering section 400. In some examples, second filtering section 300 is approximately 20-40 cm wide.

Second filtering section 300 receives water via inlet 305. The received water spreads across a distribution surface 310, which has holes 311 therein which allow the received water to pass through, by gravity, to the top of filtering layer 320. Holes 311 are sized appropriately to allow the received water to spread to, and pass through, holes 311 disposed both near to and far from inlet 305, to provide even distribution of the received water onto the top surface of filtering layer 320. As the received water falls through the gap between the lower surface of distribution surface 310 and the top of filtering layer 320, an initial aeration of the received water is performed. In some examples, distribution surface 310 may be omitted, such as where a thickness of received water is maintained above filtering layer 320 that reasonably ensures the received water is distributed across the top of filtering layer 320. In some examples, distribution surface 310 has a two-dimensional plate-like structure, with an array of holes 311 therein. In some examples, instead of a plate-like structure, distribution surface 310 may be replaced with other structures, such as tubing with holes therein to allow distribution of the received water. However, a plate-like structure is generally simpler to maintain.

Second filtering section 300 includes eight filtering layers 320, 325, 330, 335, 340, 345, 350, and 355. The received water passes through these filtering layers, and eventually passes through holes 361 in support plate 360. From the area below support plate 360, water which has been filtered by second filtering section 300 is output via outlet 380 to third filtering section 400.

Filtering layer 320 comprises sand and/or gravel. In some examples, filtering layer 320 is approximately 10 cm thick.

Filtering layer 325 serves as a biological filter, in which bacteria break down contaminants, such as nitrogenous waste. In an example of filtering layer 325, plastic tubing is cut into segments; for example, approximately 1 cm diameter tubing cut into approximately 1 cm segments. These segments may be oriented horizontally, vertically, or randomly. Many other materials and structures are suitable, although generally a porous material and/or structure is desirable. Over time, beneficial bacteria becomes established in filtering layer, and performs biological filtering. Although it generally takes around 1-2 months for an effective amount of bacteria to become established in filtering layer 325, this time may be reduced by seeding the layer with bacteria.

Filtering layer 330 comprises fine sand and/or gravel, typically more fine than the sand and/or gravel included in filtering layer 320.

Filtering layer 335 comprises materials such as cork, feathers, cotton, wool, and/or silk. In some examples, filtering layer 335 remains at least 1 cm thick during operation of second filtering section 300, despite the weight of water and filtering layers 320, 325, and 330 above it. In some examples, filtering layer 335 is approximately 1 cm think when compressed.

Filtering layer 340 comprises crushed igneous stone, such as basalt. Typically, such stone has sharp edges. As certain types of igneous rock are more acidic, such as granite, whereas other types of igneous stone, such as basalt, are more basic, some examples may take into account the type of aquatic life being kept in the aquarium in selecting a particular type of stone. In some examples, filtering layer 340 is at least 4 cm thick. In some examples, filtering layer is approximately 4 cm thick.

Filtering layer 345 comprises materials such as cork, feathers, cotton, wool, and/or silk. In some examples, filtering layer 345 remains at least 0.5 cm thick during operation of second filtering section 300, despite the weight of water and filtering layers 320, 325, 330, 335, and 340 above it. In some examples, filtering layer 335 is approximately 0.5 cm think when compressed.

Filtering layer 350 comprises sand and/or gravel. In some examples, filtering layer 350 is at least 5 cm think. In some examples, filter layer 350 is approximately 5.0-5.5 cm thick.

Filtering layer 355 comprises materials such as cork, feathers, cotton, wool, and/or silk. In some examples, filtering layer 355 remains at least 0.5 cm thick during operation of second filtering section 300, despite the weight of water and filtering layers 320, 325, 330, 335, 340, 345, and 350 above it. In some examples, filtering layer 335 is approximately 0.5-1.0 cm think when compressed.

Any of filtering layers 320, 325, 330, 335, 340, 345, 350, and 355 may be separated by a mesh or other porous material from its neighboring layers. Although the layers 320, 325, 330, 335, 340, 345, 350, and 355 have been described to be placed in a specific order, the instant application is not limited to this specific ordering and other arrangement has been contemplated.

Second filtering system 300 may also include aeration tube 370, which receives compressed air at air inlet 371, and outputs the received air via air outlets 372 located within filtering layers 320, 325, 330, 335, 340, 345, 350, and 355. This provides aeration for the water, which enhances the biological filtering performed by filtering layer 325, and also prevents overcompaction of filtering layers 320, 325, 330, 335, 340, 345, 350, and 355. Although in FIG. 3, aeration tube 370 and air outlets 372 are located within filtering layer 355, air outlets 372 may be positioned in any combination of filtering layers 320, 325, 330, 335, 340, 345, 350, and 355.

Second filtering section 300 may also include UV light sources 391-397, to irradiate the received water and kill bacteria that might otherwise seek to grow in the upper portion of second filtering system 300. In some examples, UV light sources 391-391 may be positioned at least 5 cm above distribution surface 310. In some examples, UV light sources 392-397 may be omitted, with one or more UV light sources 391 positioned near inlet 305. In such examples, power consumption may be lowered, and negative effects on the growth of bacteria in filtering layer 325 may be reduced. In some examples, UV lighting may be disabled during the initial operation of second filtering section 300, to facilitate the growth of bacteria in filtering layer 325.

FIG. 4 illustrates a cross-section of an example of the third filtering section 400 of aquarium filter system 100. Third filtering section 400 is placed in and includes housing 405, which includes wall 406. In the example illustrated in FIG. 1, in which the third filtering section 400 is horizontally adjacent to second filtering section 300, housing 405 is a portion of housing 110, and wall 406 serves as a partition between third filtering section 400 and second filtering section 300.

Third filtering section 400 includes inlet 410, which receives water from second filtering section 300. The received water passes through filter material 420, which may include, but is not limited to, materials such as cork, feathers, cotton, wool, and/or silk. From there, the water passes into chamber 430 through an opening 421. In some examples, third filtering section 400 may include a water heater 440 positioned in chamber 430 to ensure water provided to the aquarium (not illustrated) is an appropriate temperature for the aquatic life therein. For example, for carnivorous species of fish, a water temperature of 28-32 degrees C. is generally preferred, whereas for herbivorous species of fish, a water temperature of 26-28.5 degrees C. is generally preferred.

Third filtering section 400 includes piping 450, with an inlet 451 positioned to draw filtered water from chamber 430, and an outlet 452, which delivers filtered water to the aquarium or some other destination. In some examples, filter material and/or filtering element(s) may be included in piping 450.

In some examples, a pump (not illustrated) is used to return the filtered water from the third filtering section 400 to the aquarium. In some examples, the third filtering section 400 has a glass ceiling, which results in pressure being built up in the third filtering section 400 which is sufficient to return the filtered water to the aquarium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An aquarium water filtering system comprising:
 a first filtering section comprising a first housing, the first filtering section being configured to receive aquarium water for an aquarium, perform a first filtering action on the received aquarium water, and produce a first filtered water;
 a second filtering section comprising a second housing, the second filtering section being disposed horizontally adjacent to the first housing and configured to receive the first filtered water, perform a second filtering action on the first filtered water, and produce a second filtered water;
 a third filtering section comprising a third housing, the third filtering section being disposed horizontally adjacent to the second housing and configured to receive the second filtered water, perform a third filtering action on the second filtered water, and produce a third filtered water for return to the aquarium, wherein the second filtering section further includes:
  a distribution surface configured to distribute and aerate the first filtered water over an interior of the second housing;
  a biological filtering layer located below the distribution surface and configured to perform a portion of the second filtering action;
  the distribution surface including a plurality of holes configured to spread the first filtered water across a top surface of the biological filtering layer in a substantially even distribution;
  a first filtering layer comprising crushed igneous rock, wherein the first filtering layer is located below the biological filtering layer;
  wherein the second filtering section further includes a second filtering layer, the second filtering layer comprising cork, cotton, wool, or silk, wherein the second filtering layer is located between the biological filtering layer and the first filtering layer; and
  an ultraviolet light source located above the distribution surface configured to irradiate water passing through the distribution surface.

2. The aquarium water filtering system of claim 1, wherein the second filtering section further includes an aeration tube configured to release air below the biological filtering layer.

3. The aquarium water filtering system of claim 1, wherein the second filtering section further includes a second filtering layer comprising sand or gravel that is at least 10 cm thick, wherein the second filtering layer is located above the biological filtering layer and below the distribution surface.

4. The aquarium water filtering system of claim 1, wherein the ultraviolet light is positioned above an inlet through which the second filtering section receives the first filtered water.

5. The aquarium water filtering system of claim 1, wherein the biological filtering layer comprises bacteria configured to break down contaminants in the filter filtered water.

6. The aquarium water filtering system of claim 1, wherein the second filtering section further includes a third filtering layer comprising cork, cotton, wool, or silk, wherein the the third filtering layer is located below the first filtering layer.

7. The aquarium water filtering system of claim 6, wherein the second filtering layer is at least 1 cm thick, and the third filtering layer is at least 0.5 cm thick.

8. The aquarium water filtering system of claim 6, wherein the second filtering section further includes a fourth filtering layer and a fifth filtering layer, each comprising sand or gravel, wherein the fourth filtering layer is located between the biological filtering layer and the second filtering layer and the fifth filtering layer is located below the third filtering layer.

9. The aquarium water filtering system of claim 8, wherein the second filtering section further includes a sixth filtering layer comprising cork, cotton, wool, or silk, wherein the sixth filtering layer is located below the fifth filtering layer.

10. The aquarium water filtering system of claim 1, wherein the first filtering section further includes piping that is configured to deliver the received aquarium water to a lower surface of a filter material, wherein the received aquarium water passes through the filter material and exits from an upper surface of the filter material.

11. The aquarium water filtering system of claim 10, wherein the filter material comprises cork, cotton, wool, or silk.

12. The aquarium water filtering system of claim 10, wherein the first filtering section is further configured to receive the aquarium water at a height above the filter material.

* * * * *